United States Patent
Dozzini et al.

(10) Patent No.: US 11,136,986 B2
(45) Date of Patent: Oct. 5, 2021

(54) TURBO-COMPRESSOR AND METHOD OF OPERATING A TURBO-COMPRESSOR

(71) Applicant: Nuovo Pignone Tecnologie—S.r.l., Florence (IT)

(72) Inventors: Matteo Dozzini, Florence (IT); Massimiliano Ortiz Neri, Florence (IT); Duccio Fioravanti, Florence (IT); Manuele Bigi, Florence (IT)

(73) Assignee: NUOVO PIGNONE TECNOLOGIE—S.R.L., Florence (IT)

( * ) Notice: Subject to any disclaimer, the term of this patent is extended or adjusted under 35 U.S.C. 154(b) by 170 days.

(21) Appl. No.: 16/464,394

(22) PCT Filed: Nov. 21, 2017

(86) PCT No.: PCT/EP2017/079946
§ 371 (c)(1),
(2) Date: May 28, 2019

(87) PCT Pub. No.: WO2018/095917
PCT Pub. Date: May 31, 2018

(65) Prior Publication Data
US 2021/0115930 A1    Apr. 22, 2021

(30) Foreign Application Priority Data
Nov. 28, 2016    (IT) .......................... 102016000120314

(51) Int. Cl.
*F04D 17/12* (2006.01)
*F04D 29/058* (2006.01)
(Continued)

(52) U.S. Cl.
CPC ......... *F04D 17/122* (2013.01); *F04D 29/058* (2013.01); *F04D 29/0516* (2013.01);
(Continued)

(58) Field of Classification Search
CPC .. F04D 29/058; F04D 29/0516; F04D 29/284; F04D 29/286; F04D 17/122
See application file for complete search history.

(56) References Cited

U.S. PATENT DOCUMENTS

2012/0107143 A1*  5/2012  Gilarranz .............. F04D 29/104
                                                            417/53
2012/0164005 A1   6/2012  Alban

FOREIGN PATENT DOCUMENTS

CA          2952533  A1   12/2015
CN       201173196  Y    12/2008
(Continued)

*Primary Examiner* — Richard A Edgar
(74) *Attorney, Agent, or Firm* — Mintz Levin Cohn Ferris Glovsky and Popeo, P.C.

(57) ABSTRACT

According to one aspect of the present disclosure, a turbo-compressor (100) is provided. The turbo-compressor (100) includes: a rotor assembly (110) extending in an axial direction A and comprising at least one impeller (112) configured for pressurizing a gas; a magnetic bearing (120) supporting the rotor assembly (110) on a high-pressure side (113) of the at least one impeller (112); and a cooling passage (130) configured for directing a first portion of the pressurized gas (P1) through a bearing gap (132) of the magnetic bearing (120) for cooling the magnetic bearing (120). According to a further aspect, a method of operating a turbo-compressor is described.

16 Claims, 6 Drawing Sheets

(51) Int. Cl.
*F04D 29/051* (2006.01)
*F04D 29/58* (2006.01)
*F04D 29/28* (2006.01)

(52) U.S. Cl.
CPC .......... *F04D 29/284* (2013.01); *F04D 29/584* (2013.01); *F16C 2360/44* (2013.01)

(56) References Cited

FOREIGN PATENT DOCUMENTS

| | | |
|---|---|---|
| CN | 102187099 B | 1/2014 |
| EP | 0550801 A2 | 7/1993 |
| EP | 1961964 A2 | 8/2008 |
| EP | 2469100 B1 | 8/2015 |
| JP | S62189394 A | 8/1987 |
| JP | 0378596 A | 4/1991 |
| JP | H0791760 A | 4/1995 |
| JP | 2001041191 A | 2/2001 |
| JP | 2003078596 A | 3/2003 |
| JP | 2016166536 A1 | 9/2016 |
| WO | 2011006736 A1 | 1/2011 |

* cited by examiner

TURBO-COMPRESSOR AND METHOD OF OPERATING A TURBO-COMPRESSOR

TECHNICAL FIELD

The present disclosure relates to a turbo-compressor with a rotatable rotor assembly configured for pressurizing a gas as well as to a moto-compressor arrangement with a turbo-compressor, particularly for sub-sea applications. The present disclosure further relates to a method of operating a turbo-compressor. More specifically, the present disclosure relates to a turbo-compressor with a cooled magnetic bearing as well as to a method of cooling a magnetic bearing in a turbo-compressor.

BACKGROUND

A compressor is a machine which increases the pressure of a compressible fluid through the use of mechanical energy. Compressors can be used in different applications. For example, a compressor can be used in a gas turbine for pressurizing a gas. A gas turbine can be used in various industrial processes, including power generation, natural gas liquefaction and other processes. Further, a compressor can be used in a sub-sea gas compression arrangement configured to pressurize a gas in a sub-sea environment. Sub-sea compressors should withstand high surrounding hydrostatic pressures, be sealed against the entrance of seawater, and be low-maintenance.

In a turbo-compressor, a rotatable rotor assembly with one or more impellers is typically arranged in a compressor casing. The impellers may be mounted on the rotatable rotor assembly, and the pressure rise is achieved by adding kinetic energy to a continuous gas flow directed through the rotating impellers. The kinetic energy can then be converted to an increase in static pressure by slowing the gas flow through a diffuser.

Among the various types of turbo-compressors are radial compressors or centrifugal compressors, axial compressors, and mixed flow compressors. In an axial compressor, the gas may stream past one or more impellers in an axial direction essentially parallel to the shaft of the rotor assembly. In a centrifugal compressor, the gas may stream axially toward the impeller, where the gas is deflected in a radial outward direction.

Turbo-compressors can be provided with a single impeller, i.e. in a single stage configuration, or with a plurality of impellers in series, in which case the compressor may be referred to as a multistage compressor. Each of the stages of a compressor typically includes a gas inlet for the gas to be compressed, an impeller which is capable of providing kinetic energy to the input gas and a gas exit which converts the kinetic energy of the gas into pressure energy.

Typically, one, two or more bearings may be provided in a turbo-compressor, in order to support the rotor assembly. For example, a first bearing may support the rotor assembly on a low pressure side of an impeller, and a second bearing may support the rotor assembly on a high pressure side of the impeller. One or more radial bearings may be provided for taking up radial loads of the rotating rotor assembly and/or one or more thrust bearings may be provided for taking up axial loads of the rotating rotor assembly. The bearings are typically cooled, e.g. with a cooling fluid, which may be guided through a bearing gap of the bearing, respectively.

One of the relevant issues related to turbo-compressors is the risk of condensation of the cooling fluid in a bearing gap of one of the bearings which support the rotor assembly. A condensation of a cooling fluid may negatively affect the bearing capabilities, cause the rotor assembly to become instable and potentially cause a trip of the rotor assembly.

Accordingly, it would be beneficial to improve the dynamic behavior of a turbo-compressor with one or more bearings for supporting the rotor assembly. It would further be beneficial to increase the life expectancy and durability of a turbo-compressor, particularly for sub-sea applications. Further, it would be beneficial to provide a method of reliably cooling a bearing of a turbo-compressor.

SUMMARY

In light of the above, a turbo-compressor configured for pressurizing a gas, a compressor arrangement with a turbo-compressor as well as a method of operating a turbo-compressor are provided.

According to one aspect of the present disclosure, a turbo-compressor is provided. The turbo-compressor includes a rotor assembly extending in an axial direction and comprising at least one impeller configured for pressurizing a gas, a magnetic bearing supporting the rotor assembly on a high-pressure side of the at least one impeller, and a cooling passage configured to deliver a first portion of the pressurized gas through a bearing gap of the magnetic bearing for cooling the magnetic bearing.

The cooling passage may extend from a discharge area of the most downstream impeller of the turbo-compressor through the bearing gap. In this case, the first portion of the pressurized gas is used for cooling the magnetic bearing downstream from the most downstream impeller which is configured for pressurizing the gas to a delivery pressure of the turbo-compressor.

According to a further aspect of the present disclosure, a turbo-compressor is provided. The turbo-compressor includes: a rotor assembly extending in an axial direction and comprising at least one impeller configured for pressurizing a gas, a balance drum arranged on a high-pressure side of the at least one impeller and configured for an at least partial compensation of an axial thrust of the rotor assembly, and a magnetic bearing supporting the rotor assembly on a high-pressure side of the at least one impeller, wherein the magnetic bearing is arranged between the at least one impeller and the balance drum in the axial direction.

According to a further aspect of the present disclosure, a moto-compressor arrangement is provided. The compressor arrangement may be configured for sub-sea applications. The compressor arrangement includes a turbo-compressor according to embodiments described herein and a driving unit configured for driving the rotor assembly of the turbo-compressor, wherein the turbo-compressor and the driving unit are arranged in a common casing, particularly in a hermetically sealed casing.

According to a further aspect, a method of operating a turbo-compressor is provided. The method includes: pressurizing a gas by means of at least one impeller of a rotor assembly, and cooling a magnetic bearing which supports the rotor assembly by delivering a first portion of the pressurized gas along a cooling passage through a bearing gap of the magnetic bearing.

The first portion of the pressurized gas may be compressed by and/or deflected by the most downstream impeller of the turbo-compressor and then directed through the bearing gap.

Further aspects, advantages, and features of the present disclosure are apparent from the dependent claims, the description, and the accompanying drawings.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

Some embodiments are depicted in the drawings and are detailed in the description which follows.

DETAILED DESCRIPTION

Reference will now be made in detail to the various embodiments of the disclosure, one or more examples of which are illustrated in the figures. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to corresponding or to similar components. Generally, only the differences with respect to the individual embodiments are described. Unless specified otherwise, the description of a part or aspect in one embodiment applies to a corresponding part or aspect in another embodiment as well.

A turbo-compressor may be used in an industrial plant to extract a fluid, e.g. a natural gas, from a field present under the seabed. The compressor may be placed on a platform above the sea or on the seabed. A turbo-compressor, e.g. a submersible compressor, may include one or more centrifugal compressor stages configured for pushing the extracted fluid to the mainland and arranged in a common casing with a driving unit, e.g. an electric motor. Turbo-compressors may also be used for different applications, e.g. on the mainland.

A turbo-compressor may be configured as a vertical turbo-compressor, in which an axis A of a rotor assembly essentially extends in a vertical direction, i.e. in the direction of gravity. The rotor assembly may be driven in rotation by the driving unit, e.g. by an electric motor. The rotor assembly may include one or more impellers, e.g. centrifugal impellers, and a shaft of the rotor assembly may be supported by two or more bearings. For example, a radial bearing and/or an axial bearing, i.e. a thrust bearing, may be provided.

The term "gas" as used herein may be understood in a general sense as a compressible fluid.

Figure 1:
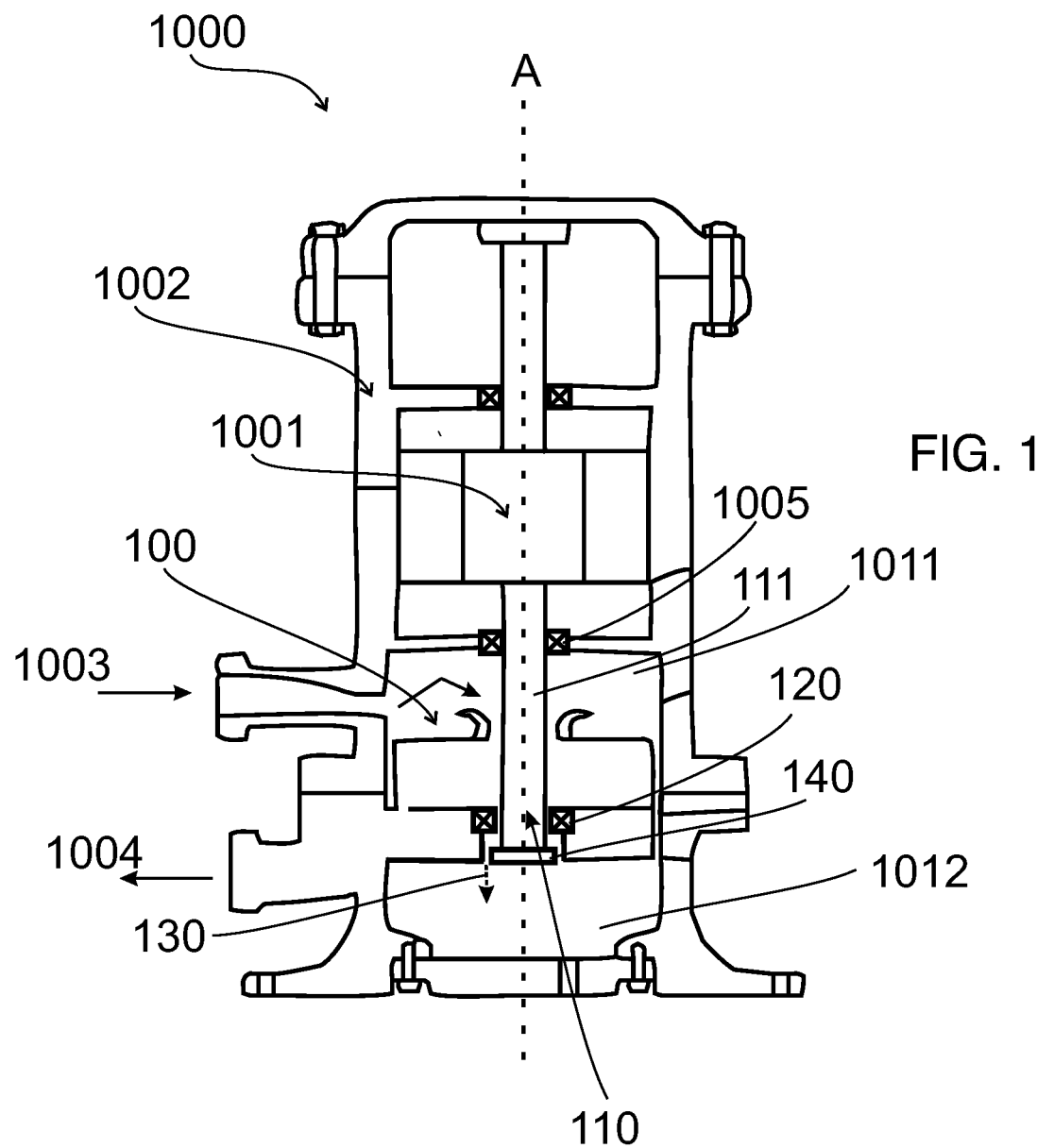
FIG. 1 is a schematic view of a compressor arrangement with a turbo-compressor according to embodiments described herein.

FIG. 1 shows a compressor arrangement 1000 with a turbo-compressor 100 in accordance with some embodiments described herein. The compressor arrangement 1000 may include a driving unit 1001, e.g. an electric motor, configured for driving the turbo-compressor 100. The turbo-compressor 100 and the driving unit 1001 may be located in a common casing 1002, e.g. in a hermetically sealed casing of the compressor arrangement 1000.

The turbo-compressor 100 may be a single-stage compressor or a multi-stage compressor with a plurality of compressor stages. For example, each of the plurality of compressor stages may have a centrifugal impeller respectively rotating inside a stator diaphragm and respectively coupled on the shaft 111 of the rotor assembly 110.

The turbo-compressor 100 may be configured as a vertical turbo-compressor in some embodiments, in which the axial direction A of the rotor assembly 110 is a vertical direction. However, in other embodiments the turbo-compressor may have a different orientation, e.g. a horizontal orientation in which the axial direction A of the rotor assembly 110 is a horizontal direction.

In the embodiment shown in FIG. 1, the driving unit 1001 is placed inside the casing 1002 and is mechanically coupled to the turbo-compressor 100 by the shaft 111. A compact machine can be obtained. In other embodiments, the driving unit for driving the turbo-compressor may be arranged outside the casing 1002, e.g. in a further casing.

In some embodiments, the driving unit 1001 may be arranged vertically above the turbo-compressor 100, in order to reduce the risk of liquid intrusion into the driving unit 1001. In other embodiments, the driving unit 1001 may be otherwise mounted. In yet further embodiments, a first compressor may be provided above the driving unit 1001 and a second compressor may be provided below the driving unit 1001.

The turbo-compressor may be driven by a driving unit 1001, e.g. by an electric motor or by a hydraulic motor. In other embodiments, the turbo-compressor may be driven by an internal combustion engine, a gas turbine, or by another driving unit.

In the embodiment of FIG. 1, the shaft 111 of the rotor assembly 110 is directly driven by the driving unit 1001. In other embodiments, a transmission mechanism, e.g. a gear, a belt drive or another appropriate force transmission means may be connected between the driving unit 1001 and the turbo-compressor 100.

The common casing 1002 may include a gas inlet 1003 fluidly connected with an inlet of the turbo-compressor 100. The casing may further include a gas outlet 1004. In a vertical compressor arrangement, the gas inlet 1003 and the gas outlet 1004 may be placed one above the other.

Details of the turbo-compressor 100 are not shown in FIG. 1. For example, the individual compressor stages and the impellers of the compressor stages are not shown in FIG. 1.

Figure 2:
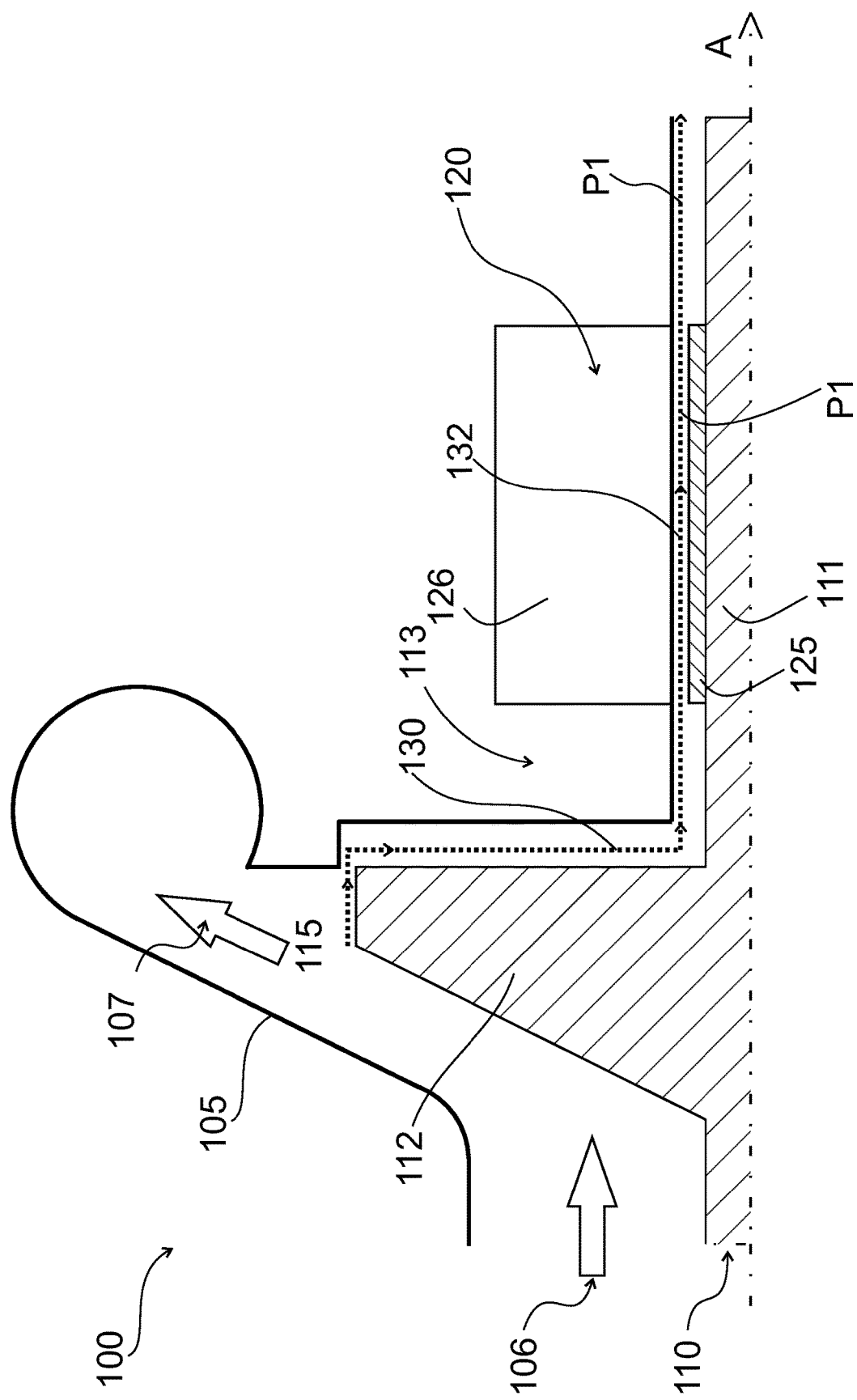
FIG. 2 is a schematic sectional view of a turbo-compressor according to embodiments described herein.

FIG. 2 is a partial view of a turbo-compressor 100 according to embodiments described herein in a schematic sectional view. The sectional plane of FIG. 2 extends along an axis of the turbo-compressor in a longitudinal direction. Only the compressor part on an upper side of the axis is shown in FIG. 2. The turbo-compressor 100 includes a rotor assembly 110 which extends in the axial direction A and includes at least one impeller 112 configured for pressurizing a gas.

The turbo-compressor 100 shown in FIG. 2 may be used in the compressor arrangement 1000 shown in FIG. 1. The turbo-compressor 100 of FIG. 2 can also be used in other applications, e.g. in a gas turbine, in a power plant and/or in a gas liquefaction system.

The at least one impeller 112 may be fixed to or integrally formed with the shaft 111 of the rotor assembly 110. The rotor assembly 110 may be rotatably installed in a compressor casing 105 of the turbo-compressor. In some embodiments, the rotor assembly 110 may include a plurality of impellers, e.g. two, three or more impellers, which may form a plurality of compressor stages.

In some embodiments, the turbo-compressor 100 may be configured as a sub-sea compressor configured for underwater operation. In a sub-sea compressor, the rotor assembly 110 may be installed in a sealed and pressure-resistant casing.

The turbo-compressor includes a magnetic bearing 120 for supporting the rotor assembly 110 on a high-pressure side 113 of the at least one impeller 112.

The magnetic bearing 120 may be an active magnetic bearing (AMB). Magnetic bearings may be used instead of conventional oil-lubricated bearings as an axial and/or radial rotatable support for the rotor assembly 110. Magnetic bearings operate based on electromagnetic principles to control axial and radial displacements of the rotor assembly. The magnetic bearing 120 may include at least one electromagnet driven by a power amplifier which regulates the voltage and therefore the current in the coils of the electromagnet as a function of a feedback signal which indicates displacement of the rotor assembly inside the casing. Magnetic bearings may not require oil as a lubricant, so that the overall maintenance of the compressor can be reduced. Further, seals between the impellers and the bearing may not be necessary. However, magnetic bearings may not be capable of handling as much axial thrust as oil-lubricated bearings.

The magnetic bearing 120 may be arranged on a high-pressure side 113 of the at least one impeller 112. If the turbo-compressor is a multistage compressor with a plurality of impellers subsequently arranged on the shaft 111 in a downstream direction, the magnetic bearing 120 may be arranged on a high-pressure side 113 of the most downstream impeller, i.e. on a side of the rotor assembly opposite a gas inlet side.

A "low-pressure side" of an impeller as used herein may be understood as an upstream side of the impeller which is directed toward the incoming gas stream 106. A "high pressure side" of an impeller as used herein may be understood as the axial side of the impeller opposite the upstream side, i.e. as the side distant from the gas inlet of the compressor. For example, in the embodiments shown in FIG. 1, the right side of the at least one impeller 112 where the magnetic bearing 120 is arranged is the high-pressure side 113 of the at least one impeller 112, and the left side of the at least one impeller 112 which is directed toward the incoming gas stream 106 is the low-pressure side of the at least one impeller 112.

In some embodiments, the rotor assembly 110 of the turbo-compressor may be supported by at least two bearings, i.e. the magnetic bearing 120 on the high-pressure side 113 of the at least one impeller 112 and a second bearing 1005 on the low pressure side of the at least one impeller 112. An example of a second bearing 1005 is shown in FIG. 1. In some embodiments, the second bearing 1005 may be a magnetic bearing as well. As is schematically depicted in FIG. 1, a third bearing or further bearings, e.g. magnetic bearings, may be provided for supporting the rotor assembly 110.

In some embodiments, a plurality of impellers (not shown) may be arranged between the magnetic bearing 120 and the second bearing 1005. The magnetic bearing 120 is arranged on the high-pressure side and the second bearing 1005 is arranged on the low-pressure side of the plurality of impellers.

In some embodiments, which may be combined with other embodiments described herein, three or more magnetic bearings may be provided for rotatably supporting the rotor assembly, for example three or more active magnetic bearings.

The magnetic bearing 120 may heat up during the operation of the turbo-compressor. Accordingly, it may be reasonable to provide a cooling passage for a flow of a cooling medium through a bearing gap 132 of the magnetic bearing 120. The bearing gap 132 of the magnetic bearing may be located between a lamination 125 of the magnetic bearing on the rotor assembly 110 and a bearing housing 126 which may surround the rotor assembly 110. The lamination 125 may rotate with the rotor assembly 110 during the operation of the turbo-compressor, whereas the bearing housing 126 may be stationary. For example, the bearing housing 126 may be connected to the compressor casing 105.

The bearing gap 132 of the magnetic bearing 120 may surround the rotor assembly 110 in a circumferential direction. The bearing gap 132 may surround the rotor assembly in the shape of a thin cylinder barrel.

A cooling medium may be guided through the bearing gap 132 for cooling the magnetic bearing 120. However, when using a cooling medium such as a saturated gas at a comparatively low temperature, there is a risk of gas condensation in the bearing gap 132. A condensation of cooling medium in the bearing gap 132 may lead to liquid accumulation along the bearing gap or in a bottom part of the magnetic bearing. This may negatively affect the magnetic bearing over time, impacting the system stability and causing a trip of the rotor assembly.

According to embodiments disclosed herein, the turbo-compressor includes a cooling passage 130 configured to deliver a first portion of the pressurized gas P1 through the bearing gap 132 of the magnetic bearing 120 for cooling the magnetic bearing. In other words, the pressurized gas which is typically hot and has a high pressure, is used as the cooling medium in the bearing gap 132 of the magnetic bearing. Due to the high gas pressure and the high temperature of the cooling medium in the bearing gap, a condensation of the cooling medium in the bearing gap can be reduced or entirely avoided. Instabilities of the rotor assembly can be reduced or avoided.

The "pressurized gas" as used herein which is guided through the bearing gap may be understood as the gas from a gas discharge area of the at least one impeller 112, which may be the most downstream impeller of a plurality of impellers. The "most downstream impeller" as used herein may be understood as the last impeller in a downstream direction of the turbo-compressor, which is configured for compressing the gas to a delivery or exit pressure of the turbo-compressor. In other words, the pressurized gas which is directed through the cooling passage 130 may be a first portion of the pressurized gas P1 downstream from the last impeller of a plurality of impellers of the turbo-compressor pressurized at the delivery pressure.

The "gas discharge area of the at least one impeller" may be understood as an area directly adjacent to or downstream from the at least one impeller 112 which is passed by a main stream 107 of the pressurized gas before exiting the turbo-compressor.

In some embodiments, the pressure and/or the temperature of the first portion of the pressurized gas P1 in the cooling passage 130 may essentially correspond to a delivery pressure and/or a delivery temperature of the pressurized gas leaving the turbo-compressor. For example, the (absolute) pressure of the first portion of the pressurized gas P1 in the cooling passage may be 70% or more, particularly 80% or more, more particularly 90% or more of the delivery pressure of the gas leaving the turbo-compressor.

In some embodiments, there may be a pressure drop and/or a temperature drop of the first portion of the pressurized gas P1 during propagation through the bearing gap 132 along the cooling passage 130. Said pressure drop and/or temperature drop may be small enough to essentially avoid a condensation of a cooling medium in the bearing gap.

In some embodiments, which may be combined with other embodiments described herein, the turbo-compressor 100 may include a plurality of impellers, e.g. two, three or more impellers subsequently arranged in a downstream direction. As already noted, the at least one impeller 112 may be the most downstream impeller of the plurality of impellers configured for pressurizing the gas to the delivery pressure of the turbo-compressor 100. When a portion of the pressurized gas P1 downstream from the last impeller is used for cooling the magnetic bearing 120, a condensation of the cooling medium in the bearing gap 132 can be effectively reduced due to the high temperature and pressure of the pressurized gas downstream from the last impeller of the plurality of impellers.

For example, the first portion of the pressurized gas P1 may be branched off from the main stream 107 of the pressurized gas downstream from the at least one impeller 112, e.g. from the gas discharge area 115 of the at least one impeller 112. The first portion of the pressurized gas P1 may be directed through the cooling passage 130 which may extend at least partially in an axial direction through the bearing gap 132 on the high-pressure side 113 of the at least one impeller 112. Condensation of a cooling medium in the bearing gap 132 can be reduced or avoided.

The first portion of the pressurized gas P1 which is directed through the cooling passage 130 may be a fraction of the main stream 107 of the pressurized gas which is directed toward a gas outlet of the turbo-compressor, e.g. 10% or less, particularly 5% or less of the main stream 107.

According to embodiments described herein, the magnetic bearing 120 on the discharge side of the turbo-compressor may be cooled by a portion of the pressurized gas flow downstream from the last impeller of the turbo-compressor, thereby increasing the pressure and the temperature of the cooling gas flow in the bearing gap. The cooling arrangement for the magnetic bearing is integrated in the gas flow of the turbo-compressor, and the cooling arrangement is simplified.

Further, the mass flow of the cooling medium through the bearing gap 132 can be increased with respect to previously used cooling arrangements.

Figure 3:
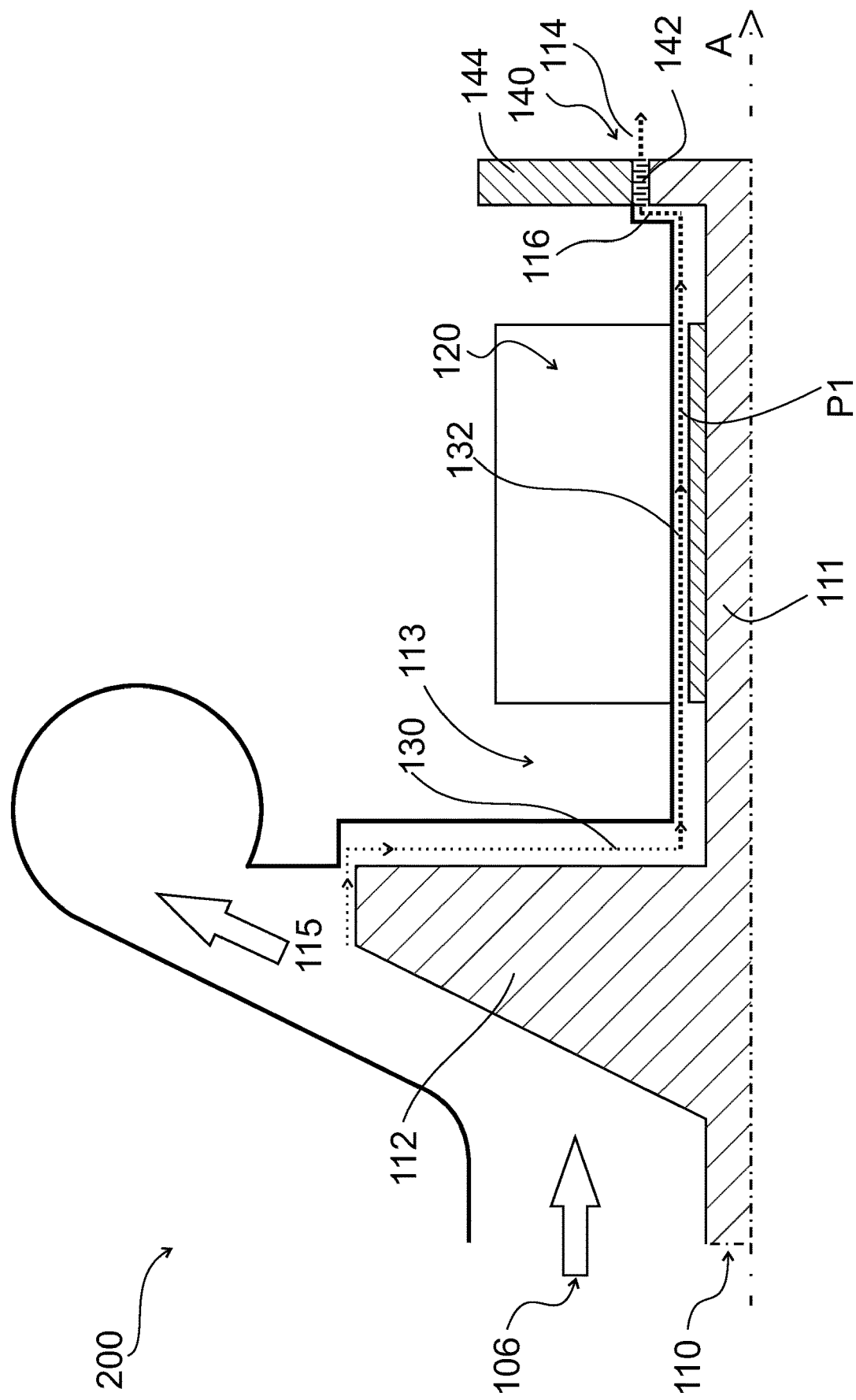
FIG. 3 is a schematic sectional view of a turbo-compressor according to embodiments described herein.

FIG. 3 illustrates a turbo-compressor 200 according to embodiments described herein in a schematic sectional view. The sectional plane of FIG. 3 extends along the axis of the turbo-compressor 200 in a longitudinal direction. The turbo-compressor 200 may be similar to the turbo-compressor 100 of FIG. 2, and corresponding features are not repeated here.

In particular, the turbo-compressor 200 includes a rotor assembly 110 which extends in the axial direction A and includes at least one impeller 112 or a plurality of impellers configured for pressurizing a gas.

Turbo-compressors may be subjected to an axial thrust on the rotor assembly 110 caused by the differential pressure across the compressor stages and the change of momentum of the gas. This axial thrust can be at least partially compensated by a balance drum and/or by an axial bearing. Since an axial bearing can typically not be loaded by the entire thrust of the rotor assembly 110, a balance drum may be designed to compensate for a portion of the thrust, leaving an (optional) axial bearing to handle any remaining thrust. In some embodiments, no axial bearing may be necessary. The balance drum may be implemented as a rotating disc, step or protrusion which is fitted onto the rotor assembly 110 or which is integrally formed with the rotor assembly 110. Each side of the balance drum may be subjected to a different pressure during operation. In some embodiments, the diameter of the balance drum may be chosen to have an appropriate axial load to prevent the residual load from overloading an axial bearing. Providing a balance drum may be beneficial in combination with one or more magnetic bearings which may not be able to take sufficient axial loads of the rotor assembly 110.

In some embodiments, which may be combined with other embodiments described herein, the turbo-compressor 200 may include a balance drum 140 arranged on the high-pressure side 113 of the at least one impeller 112. The balance drum 140 may be configured for providing an at least partial compensation of the axial thrust of the rotor assembly 110.

In some embodiments, the balance drum 140 may be provided as a step, a disc, or a balance piston on the rotor assembly 110. The shape of the balance drum is not particularly restricted, as long as the balance drum 140 is capable of providing an at least partial compensation of the axial thrust of the rotor assembly. A pressure difference may be maintained between a high-pressure side 116 of the balance drum and a low-pressure side 114 of the balance drum.

In some embodiments, the at least one impeller is arranged on the high-pressure side 116 of the balance drum 140, and the low-pressure side 114 of the balance drum may be the opposite side, i.e. the downstream side of the balance drum 140. A low-pressure area 1012 may be provided on the low-pressure side of the balance drum 140 (see FIG. 1).

According to an aspect of the present disclose, which may be combined with other aspects described herein, the magnetic bearing 120 may be arranged between the at least one impeller 112 and the balance drum 140 in the axial direction A. In some embodiments, the magnetic bearing 120 may be arranged between the most downstream impeller of a plurality of impellers and the balance drum 140.

Accordingly, the magnetic bearing 120 may be arranged in a high-pressure area of the rotor assembly 110, i.e. between the last impeller and the balance drum 140.

Accordingly, the setup of the cooling arrangement can be simplified and the balance drum gas flow which extends from a downstream side of the last impeller toward the high-pressure side 116 of the balance drum 140 may be used for cooling the magnetic bearing 120.

In some embodiments, which may be combined with other embodiments described herein, the cooling passage 130 extends from the gas discharge area 115 of the at least one impeller 112 in a downstream direction through the bearing gap 132 and then passes through the balance drum 140 from the high-pressure side 116 of the balance drum 140 to the low-pressure side 114 of the balance drum 140.

The balance drum may include a balance drum seal 142 configured to maintain the pressure difference between the high-pressure side 116 and the low-pressure side 114 of the balance drum. In some embodiments, the balance drum seal 142 may be a labyrinth seal. The cooling passage 130 may extend through the balance drum seal 142, e.g. through a labyrinth passage provided in the balance drum seal 142, toward the low-pressure side 114 of the balance drum 140.

The balance drum seal 142 may be a rotating component which is fixed to the rotor assembly 110, or the balance drum seal 142 may alternatively be a stationary component which is fixed to a stationary part 144 of the turbo-compressor, e.g. to a casing part. In some embodiments, a first part of the balance drum seal 142 is fixed to the rotor assembly 110, and a second part of the balance drum seal 142 is fixed to the stationary part 144 of the turbo-compressor. The balance drum gap may be provided between an outer surface of the balance drum and a mating inner surface of the stationary part 144. The balance drum seal 142 may be arranged in the balance drum gap and may define the balance drum gap.

Accordingly, in some embodiments, the cooling passage 130 may extend from the gas discharge area 115 of the at least one impeller 112 through the bearing gap 132 and further from the high-pressure side 116 of the balance drum 140 through the balance drum seal 142 toward the low-pressure side of the balance drum 140. Accordingly, the balance drum gas flow can be used for cooling the magnetic bearing 120 arranged on the high-pressure side 116 of the balance drum 140.

The low-pressure side 114 of the balance drum 140 may be held at a low pressure. For example, the low-pressure side 114 of the balance drum may be connected to an atmospheric pressure or to an entrance gas pressure of the turbo-compressor. For example, as is schematically indicated in FIG. 1, a gas entrance area 1011 of the turbo-compressor may be in fluid connection with a low-pressure area 1012 on the low-pressure side 114 of the balance drum 140 via a balance line. The balance line may maintain the pressure in the low-pressure area 1012 on the low-pressure side 114 of the balance drum 140 at substantially the same pressure as that of the process gas entering via the gas inlet 1003. The axial thrust of the rotor assembly 110 can be effectively compensated by the balance drum 140 configured for maintaining said pressure difference.

In some embodiments, a control unit, e.g. a control valve, may be provided for adjusting a pressure in the low-pressure area 1012, e.g. based upon a sensed axial loading on or near one of the bearings.

The at least one impeller 112 may place an axial load on the rotor assembly in the direction of the low pressure side of the turbo-compressor, e.g. due to differences of pressure between stages, changes in gas momentum etc. The driving unit 1001 which rotates the rotor assembly 110 may place a substantially constant axial load on the rotor assembly in the opposite direction, i.e. toward the high pressure side of the turbo-compressor. To counteract the remaining axial load of the at least one impeller 112, the balance drum 140 may be designed to exert an axial force on the rotor assembly, the magnitude of which may be based on the expected axial load of the impellers minus that of the driving unit. This may be accomplished by, e.g. designing the system such that the gas pressure on the low-pressure side of the balance drum is lower than the pressure on the high-pressure side of the balance drum, and/or by selecting a balance drum of an appropriate size, e.g. diameter, to generate the appropriate balancing force. The pressure imbalance may be maintained by providing the balance line between the low-pressure side 114 and the gas entrance area 1011 of the turbo-compressor.

Figure 4:
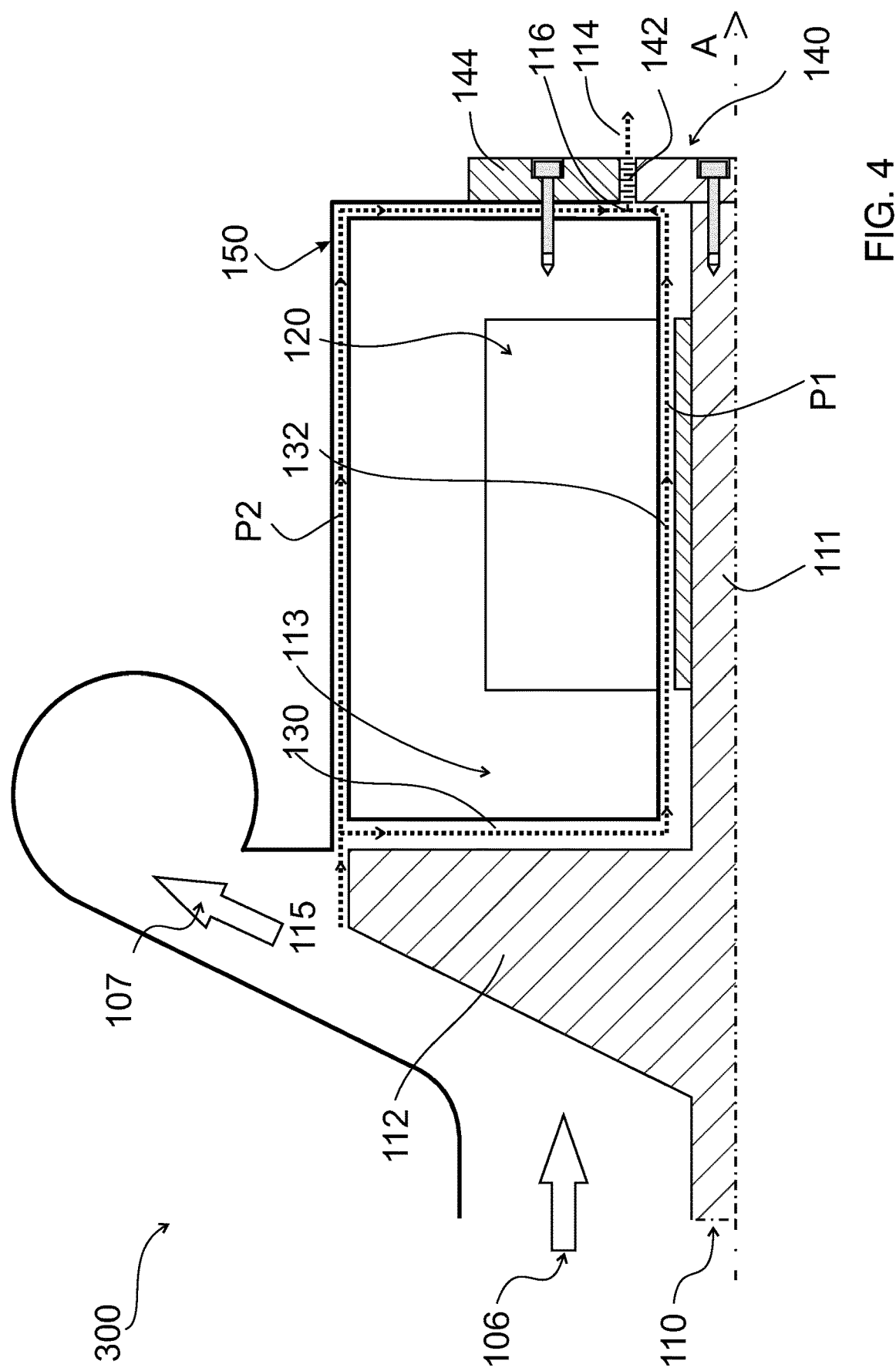
FIG. 4 is a schematic sectional view of a turbo-compressor according to embodiments described herein.

FIG. 4 shows an upper part of a turbo-compressor 300 according to embodiments described herein in a schematic sectional view. The sectional plane of FIG. 4 extends along the axis of the turbo-compressor 300 in a longitudinal direction. The turbo-compressor 300 may be similar to the turbo-compressor 200 of FIG. 3, and corresponding features are not repeated here.

In particular, the turbo-compressor 300 may include a balance drum 140 and a magnetic bearing 120 which is arranged between the at least one impeller 112 and the balance drum 140 in the axial direction A. The cooling passage 130 may extend from the gas discharge area 115 of the at least one impeller 112 through the bearing gap 132 of the magnetic bearing 120 and through the balance drum seal 142 to a low-pressure side 114 of the balance drum 140.

In some embodiments, which may be combined with other embodiments described herein, the turbo-compressor 300 may include a bypass passage 150 configured to deliver a second portion of the pressurized gas P2 from the gas discharge area 115 of the at least one impeller 112 to a portion of the cooling passage 130 downstream from the bearing gap 132.

The bypass passage 150 may provide a fluid connection between the gas discharge area 115 of the at least one impeller 112 and a portion of the cooling passage 130 downstream from the bearing gap 132. The second portion of the pressurized gas P2 which is directed through the bypass passage 150 may be a fraction of the main stream 107 of the pressurized gas which is directed toward a gas outlet of the turbo-compressor, e.g. 10% or less, particularly 5% or less of the main stream 107. The second portion of the pressurized gas P2 which streams through the bypass passage 150 may have a high pressure and/or a high temperature. For example, the pressure and the temperature of the second portion of the pressurized gas P2 may essentially correspond to a delivery pressure and/or a delivery temperature of the turbo-compressor.

For example, in some embodiments, the first portion of the pressurized gas P1 may flow through the cooling passage 130 downstream from the most downstream impeller, and the second portion of the pressurized gas P2 may flow through the bypass passage 150 downstream from the most downstream impeller. The cooling passage 130 and the bypass passage 150 may merge downstream from the bearing gap 132.

By providing the bypass passage 150, a pressure drop in the cooling passage 130 over the bearing gap 132 can be reduced or avoided. In particular, essentially the same pressure, i.e. a high pressure, in the cooling passage 130 on both sides of the bearing gap 132 in the axial direction A can be guaranteed by providing the bypass passage 150 which may directly connect the downstream side of the bearing gap with the gas discharge area 115 of the last impeller. A condensation of cooling fluid in the bearing gap can be reduced or avoided.

The cooling passage 130 may at least partially have the shape of a cylinder jacket circumferentially surrounding the rotor assembly and extending in the axial direction A. The bypass passage 150 may be provided as one or more channels which may extend at least partially separate from each other, e.g. at least partially in the axial direction A. One of the channels of the bypass passage 150 is shown in FIG. 4 in a longitudinal sectional view. For example, one or more channels of the bypass passage 150 may extend radially outside from the bearing housing 126 at one or more different angular positions.

For example, two channels of the bypass passage 150 may be provided on opposite sides of the axis of the rotor assembly. In some embodiments, the bypass passage 150 may include four channels which may be provided at four angular positions, e.g. at an angle of 90° with respect to respective adjacent channels. In some embodiments, the bypass passage 150 may include more than four channels. A symmetric arrangement of channels of the bypass passage 150 may be provided.

The bypass passage 150 may merge with the cooling passage 130 at a position upstream from the balance drum 140, i.e. on the high-pressure side 116 of the balance drum 140. Thus, a high pressure can be guaranteed on the high-pressure side 116 of the balance drum 140 due to the bypass passage 150, even in the case of a pressure drop over the cooling passage 130. Accordingly, an appropriate pressure difference between the high-pressure side 116 and the low-pressure side 114 of the balance drum 140 can be guaranteed, and the thrust compensation of the balance drum 140 is not negatively affected by a potential pressure drop over the cooling passage.

In particular, in some embodiments, which may be combined with other embodiments described herein, the bypass passage 150 may provide a direct connection between the gas discharge area 115 of the at least one impeller 112 and the high-pressure side 116 of the balance drum 140. Depending on operating condition, an opening dimension of the bypass passage 150 could be such as to optimize the thermal and rotordynamic behavior, e.g. going from 0% to 100% of the gas flow.

The bypass passage 150 and the cooling passage 130 may provide two parallel streams of pressurized gas from the gas discharge area 115 of the at least one impeller 112 to the high-pressure side 116 of the balance drum 140. The cooling passage 130 and the bypass passage 150 may be branched off from a main stream 107 of the pressurized gas.

In some embodiments, which may be combined with other embodiments described herein, the balance drum 140 may be arranged near an axial end of the rotor assembly 110. In particular, the balance drum 140 can be arranged directly in contact with the axial end of the rotor assembly 110 or can be indirectly connected to it by means of an intermediate element. The intermediate element can have an axial length less than 50 cm, preferably less than 10 cm, more preferably less than 2 cm. For example, the balance drum 140 may constitute an axial end of the rotor assembly 110. The maintenance and the adjustment of the balance drum 140 can be facilitated when the balance drum 140 is provided near the axial end of the rotor assembly.

In particular, the adjustment of the balance drum seal 142 between the rotating part of the balance drum 140 and the stationary part 144 of the turbo-compressor can be simplified. For example, a misalignment of the balance drum seal 142 and/or of the balance drum gap could cause a side load effect which can be avoided according to embodiments described herein. In some embodiments, the balance drum seal 142 is fixed to the stationary part 144 of the turbo-compressor, and the balance drum 140 which is arranged near the axial end of the rotor assembly can be centered with respect to the balance drum seal 142.

In some embodiments, which can be combined with other embodiments described herein, the balance drum 140 may be detachably connected to the shaft 111 of the rotor assembly 110, particularly to an axial end of the shaft 111. The centering of the balance drum 140 with respect to the stationary part 144 of the turbo-compressor which forms a balance drum gap between an outer surface of the balance drum and an inner surface of the stationary part 144 can be simplified.

In the embodiment shown in FIG. 4, the balance drum 140 is fixed to an axial end of the shaft 111 via a fixing device, e.g. via a screw or a bolt. In some embodiments, also the stationary part 144 which forms a mating surface with an outer surface of the balance drum 140 may be connected to a casing part of the turbo-compressor via a fixing device, e.g. via a screw. The centering of the balance drum 140 with respect to the stationary part 144 can be further simplified.

Figure 5:
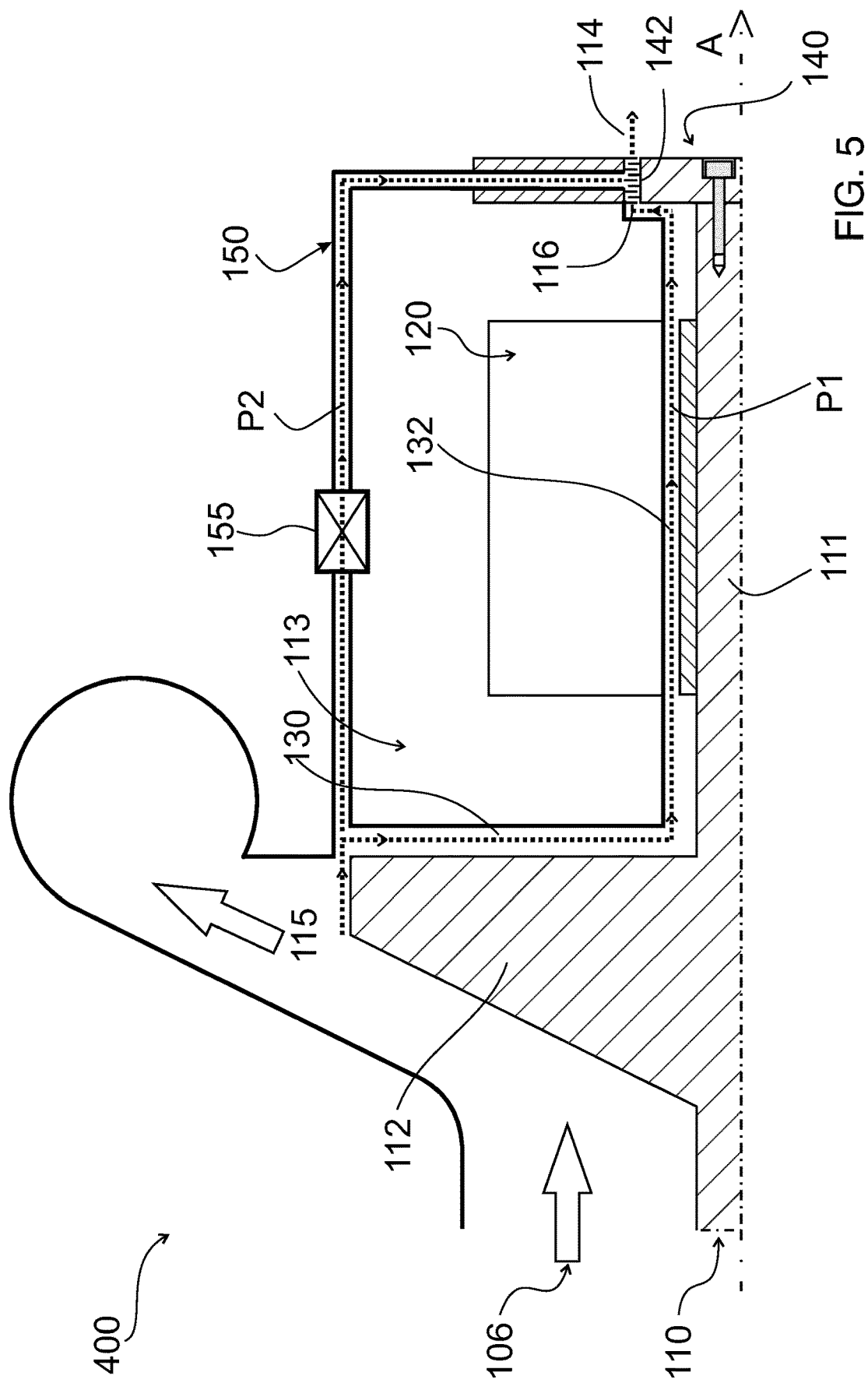
FIG. 5 is a schematic sectional view of a turbo-compressor according to embodiments described herein.

FIG. 5 shows a turbo-compressor 400 according to embodiments described herein in a schematic sectional view. The sectional plane of FIG. 5 extends along the axis of the turbo-compressor 400 in a longitudinal direction. The turbo-compressor 400 may be similar to the turbo-compressor 300 of FIG. 4, and corresponding features are not repeated here.

In particular, the turbo-compressor 300 may include a balance drum 140 and a magnetic bearing 120 arranged between the at least one impeller 112 and the balance drum 140 in the axial direction A. The cooling passage 130 may extend from the at least one impeller 112 through the bearing gap 132 of the magnetic bearing 120 and through a balance drum seal 142 to a low-pressure side 114 of the balance drum 140. Further, a bypass passage 150 may be provided.

In some embodiments, which may be combined with other embodiments described herein, the turbo-compressor may further include a control unit 155, particularly comprising a valve, configured for adjusting a flow of the second portion of the pressurized gas P2 through the bypass passage 150. For example, the flow of the second portion of the pressurized gas P2 through the bypass passage 150 may be adjusted via the control unit 155.

By adjusting the flow of the second portion of the pressurized gas P2 through the bypass passage, a pressure and/or a flow of the first portion of the pressurized gas P1 in the cooling passage 130 can be changed. A flow of cooling gas may be adjusted in some embodiments. Alternatively or additionally, a pressure difference between the high-pressure side of the balance drum and the low-pressure side of the balance drum can be adjusted via the control unit 155.

In some embodiments, the bypass passage 150 and the cooling passage 130 may be conjoined or merged at a position in the balance drum seal 142, e.g. in a passage of a labyrinth seal. A swirling of gas in the balance drum seal 142 may be reduced or prevented by the second portion of the pressurized gas P2 flowing into the cooling passage at a position in the balance drum seal, which may be a labyrinth seal. For example, the first portion of the pressurized gas P1 may be guided through the balance drum seal 142 in an essentially axial direction, and the second portion of the pressurized gas P2 may flow into a passage of the balance drum seal from an at least partially radial direction, as is schematically depicted in FIG. 5.

In some embodiments, the bypass passage 150 may have one or more channels configured for directing pressurized gas into the seal of the balance drum from essentially equispaced directions. Only one of said channels is shown in FIG. 5. Accordingly, a symmetric gas load may act on the balance drum 140, and an instability of the rotor assembly due to the second portion of the pressurized gas P2 can be prevented. Further, the swirling of the gas in the balance drum gap can be effectively broken.

For example, at least one channel of the bypass passage 150 may be configured as a shunt hole extending through a stationary part 144 of the turbo-compressor toward the balance drum gap, e.g. in an essentially radial direction. For example, the shunt hole may end in a passage of the balance drum seal 142, e.g. in a central passage of the balance drum seal in the axial direction A.

In some embodiments, which may be combined with other embodiments described herein, the turbo-compressor may be configured as a centrifugal compressor, and the at least one impeller may be a centrifugal impeller configured for directing the pressurized gas in a radial direction away from the rotor assembly. In particular, each impeller of a plurality of impellers of the turbo-compressor may be configured as a centrifugal impeller. In other embodiments, at least one or more impellers of the turbo-compressor may be configured as axial impellers.

In some embodiments, the turbo-compressor may be configured as a canned turbo-compressor. The turbo-compressor may be arranged in a hermetically sealed casing that allows no leakage of gas.

Figure 6:
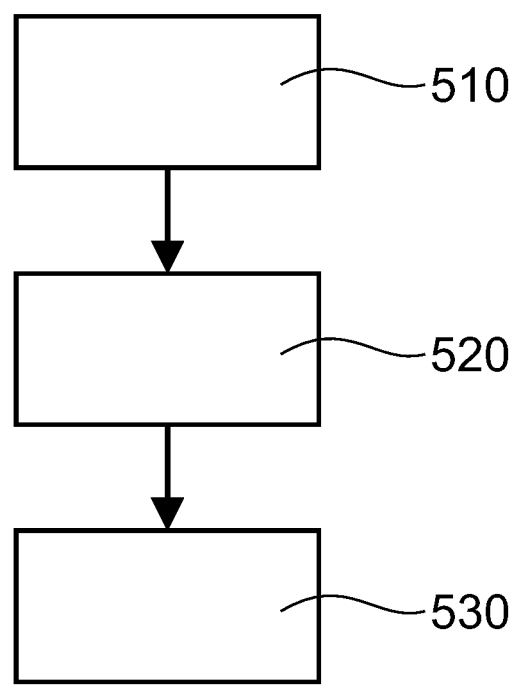
FIG. 6 is a flow diagram illustrating a method of operating a turbo-compressor according to embodiments described herein.

FIG. 6 is a flow diagram for illustrating a method of operating a turbo-compressor according to embodiments described herein. In box 510, the method includes pressurizing a gas by directing the gas past at least one rotating impeller of a rotor assembly 110. The at least one impeller may be the most downstream impeller of a plurality of impellers mounted on the rotor assembly and may be part of the last compressor stage which is configured to pressurize the gas to a delivery pressure of the turbo-compressor.

In box 520, a first portion of the pressurized gas P1, after streaming past the at least one impeller 112, may be delivered along a cooling passage 130 through a bearing gap 132 of a magnetic bearing 120 for cooling the magnetic bearing 120.

The first portion of the pressurized gas P1 may be branched off from a main stream 107 of the pressurized gas which is directed toward a gas outlet of the turbo-compressor.

In some embodiments, the method may further include compensating an axial thrust of the rotor assembly 110 by providing a pressure difference between a high-pressure side 116 and a low-pressure side 114 of a balance drum 140, wherein the magnetic bearing 120 may be arranged between the at least one impeller and the balance drum.

In optional box 530, the method may further include delivering, downstream from the bearing gap 132, the first portion of the pressurized gas P1 to the balance drum 140. In particular, the first portion of the pressurized gas may be directed to a balance drum seal 142 which separates the high-pressure side of the balance drum from the low-pressure side of the balance drum.

Optionally, the method may further include delivering a second portion of the pressurized gas P2 through a bypass passage 150 extending from a gas discharge area of the at least one impeller to a portion of the cooling passage 130 positioned downstream from the bearing gap 132.

In some embodiments, the second portion of the pressurized gas P2 streaming through the bypass passage 150 and the first portion of the pressurized gas P1 streaming through the cooling passage 130 may flow together at a position upstream from the balance drum, e.g. directly upstream from the balance drum, i.e. on a high-pressure side of the balance drum.

The first portion of the pressurized gas P1 and/or the second portion of the pressurized gas P2 may be branched off from a main stream 107 of the pressurized gas which is directed toward a gas outlet of the turbo-compressor. The second portion of the pressurized gas P2 may be directed through the bypass passage, and then past the balance drum to a low-pressure side of the balance drum.

In some embodiments, the first portion of the pressurized gas P1 and the second portion of the pressurized gas P2 may flow together at a position upstream from the balance drum on the high-pressure side of the balance drum.

Alternatively, the first portion of the pressurized gas P1 and the second portion of the pressurized gas P2 may flow together at a position in the balance drum seal 142, e.g. in a passage of a labyrinth seal. This may help to break a swirling of gas in the balance drum seal.

For example, the second portion of the pressurized gas P2 may flow into the first portion of the pressurized gas P1 in a center portion of the balance drum seal, in order to break a swirling of gas in the balance drum seal.

A flow rate or a pressure of the first portion of the pressurized gas P1 may be regulated by adjusting a flow rate or a pressure of the second portion of the pressurized gas P2 in the bypass passage 150, e.g. via a control unit 155 provided in the bypass passage 150.

In some embodiments, which may be combined with other embodiments described herein, the gas may enter the turbo-compressor at a first pressure and a first temperature, and the first portion of the pressurized gas P1 may be directed through the bearing gap 132 at a second pressure and a second temperature which are respectively higher than the first pressure and the first temperature.

In some embodiments, the second pressure may be twice the first pressure or more, and/or the second temperature may be more than 10° C. higher than the first temperature, particularly more than 20° C. or more than 30° C. higher. A condensation of the pressurized gas in the bearing gap can be reduced and the durability of the turbo-compressor can be improved.

While the foregoing is directed to embodiments of the disclosure, other and further embodiments of the disclosure may be devised without departing from the basic scope thereof, and the scope thereof is determined by the claims that follow.

The invention claimed is:

1. A turbo-compressor comprising:
   a rotor assembly extending in an axial direction and comprising at least one impeller configured for pressurizing a gas;
   a magnetic bearing supporting the rotor assembly on a high-pressure side of the at least one impeller; and
   a cooling passage configured to deliver a first portion of the pressurized gas through a bearing gap of the magnetic bearing for cooling the magnetic bearing;
   a balance drum arranged on the high-pressure side of the at least one impeller;
   wherein the magnetic bearing is arranged between the at least one impeller and the balance drum in the axial direction.

2. The turbo-compressor of claim 1, wherein the rotor assembly comprises a plurality of impellers and wherein the at least one impeller is a most downstream impeller of the plurality of impellers, said most downstream impeller being configured for pressurizing the gas to a delivery pressure of the turbo-compressor, and wherein the first portion of the pressurized gas is a portion of the gas pressurized at the delivery pressure.

3. The turbo-compressor of claim 1, wherein the cooling passage extends in a downstream direction from a gas discharge area of the at least one impeller, passes through the bearing gap and then passes through the balance drum from a high pressure side to a low-pressure side of the balance drum.

4. The turbo-compressor of claim 3, wherein the cooling passage extends through a balance drum seal configured to maintain a pressure difference between the high-pressure side of the balance drum and the low-pressure side of the balance drum, particularly through a labyrinth seal.

5. The turbo-compressor of claim 1, further comprising a bypass passage configured to deliver a second portion of the pressurized gas from a gas discharge area of the at least one impeller to a portion of the cooling passage downstream from the bearing gap.

6. The turbo-compressor of claim 5, further comprising a control unit, particularly comprising a valve, configured for adjusting a flow of the second portion of the pressurized gas through the bypass passage.

7. The turbo-compressor of claim 5, wherein the bypass passage and the cooling passage are conjoined at a position upstream from the balance drum or at a position in a balance drum seal.

8. The turbo-compressor of claim 1, wherein the balance drum is connected directly or indirectly, by means of an intermediate element, to an axial end of the rotor assembly.

9. The turbo-compressor of claim 8, wherein the balance drum is detachably connected to a shaft end of the rotor assembly.

10. A moto-compressor arrangement, comprising:
a turbo-compressor of claim 1; and
a driving unit configured for driving the rotor assembly of the turbo-compressor,
wherein the turbo-compressor and the driving unit are arranged in a common casing, particularly in a hermetically sealed casing.

11. A method of operating a turbo-compressor, comprising:
pressurizing a gas by means of at least one impeller of a rotor assembly; and
cooling a magnetic bearing which supports the rotor assembly by delivering a first portion of the pressurized gas along a cooling passage through a bearing gap of the magnetic bearing;
compensating an axial thrust of the rotor assembly by providing a pressure difference between a high-pressure side and a low-pressure side of a balance drum;
wherein the magnetic bearing is arranged between the at least one impeller and the balance drum.

12. The method of claim 11, further comprising:
delivering the first portion of the pressurized gas through the bearing gap to the balance drum, particularly to a balance drum seal which separates the high-pressure side of the balance drum from the low-pressure side of the balance drum.

13. The method of claim 11, further comprising:
delivering a second portion of the pressurized gas through a bypass passage extending from a gas discharge area of the at least one impeller to a portion of the cooling passage positioned downstream from the bearing gap.

14. The method of claim 13, wherein the first portion of the pressurized gas and the second portion of the pressurized gas are joined together at a position upstream from the balance drum on the high-pressure side of the balance drum, or wherein the first portion of the pressurized gas and the second portion of the pressurized gas are joined together at a position in the balance drum seal.

15. The method of claim 13, comprising the additional step of regulating a flow rate or a pressure of the first portion of the pressurized gas by adjusting a flow rate or a pressure of the second portion of the pressurized gas.

16. The method of claim 11, wherein the gas enters the turbo-compressor at a first pressure and a first temperature, and wherein the first portion of the pressurized gas is directed through the bearing gap at a second pressure and a second temperature which are respectively higher than the first pressure and the first temperature.

\* \* \* \* \*